United States Patent

[11] 3,558,009

| [72] | Inventor | Clarence F. Carter |
| | | Danville, Ill. |
| [21] | Appl. No. | 746,188 |
| [22] | Filed | July 19, 1968 |
| [45] | Patented | Jan. 26, 1971 |
| [73] | Assignee | Carter Engineering Company |
| | | Danville, Ill. |
| | | a corporation of Illinois |

[54] OSCILLATING ROCKER HOPPER AND METHOD
10 Claims, 4 Drawing Figs.

[52] U.S. Cl. .................................................. 222/1,
222/161
[51] Int. Cl. ................................................ B67d 5/64
[50] Field of Search .......................................... 222/1, 161,
196, 199, 200; 209/195, 196, 198; 259/(Inquired)

[56] References Cited
UNITED STATES PATENTS

| 3,173,583 | 3/1965 | Wahl | 222/199 |
| 3,186,602 | 6/1965 | Ricciardi | 222/161 |
| | | FOREIGN PATENTS | |
| 643,939 | 9/1928 | France | 222/196 |
| 681,662 | 3/1964 | Canada | 222/164 |

Primary Examiner—Robert B. Reeves
Assistant Examiner—H. S. Lane
Attorney—Burns, Doane, Benedict, Swecker & Mathis ABSTRACT: A method of feeding particulate material which utilizes a vertically extending hopper configured to cause material within the hopper to move gravitationally down to a lower outlet opening of the hopper. The method includes a step of subjecting the hopper to cycles of oscillating transverse motion in a predetermined, generally horizontal path to impose a side-to-side horizontal throwing action on the material within the hopper. Additionally, the hopper is subjected to cycles of oscillating rocking motion about a generally horizontal axis at periods occurring during the cycles of transverse motion.

An apparatus which is intended for feeding particulate material. The apparatus includes a vertically extending hopper having wall means for confining the material and for moving it gravitationally towards a lower opening. Frame means support the hopper for limited movement. Oscillating means connected with the frame means and with the hopper applies an oscillating transverse motion to the hopper. Rocking means also connected with the hopper and the frame means applies vertical rocking oscillation to the hopper at some time during each cycle of the transverse motion.

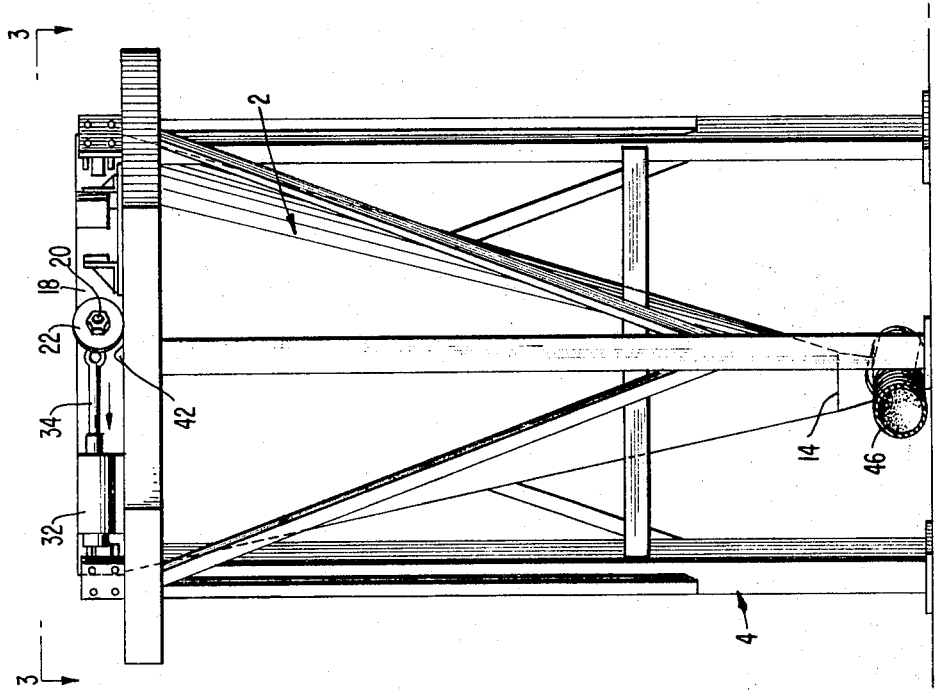
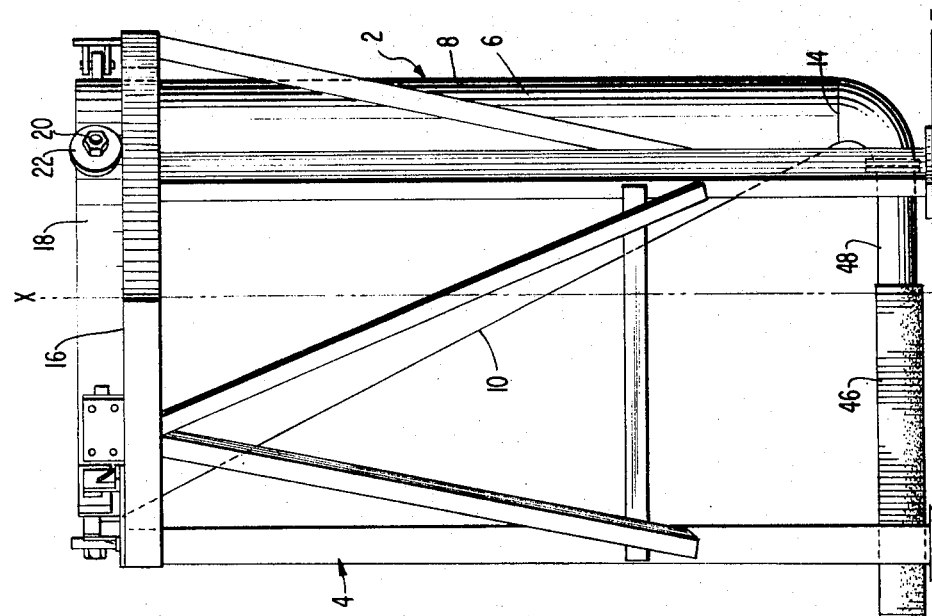

INVENTOR
CLARENCE F. CARTER

OSCILLATING ROCKER HOPPER AND METHOD

BACKGROUND OF THE INVENTION

This invention relates to a method and apparatus for feeding particulate material. In particular, the invention relates to a method and apparatus for feeding particulate material utilizing a generally vertical hopper which is subjected to compound oscillating motions to prevent bridging of the material within the hopper.

In feeding particulate material from a hopper of the type configured to cause material within the hopper to move gravitationally down and out through a lower outlet opening, problems of material bridging are frequently encountered. Bridging in this context refers to a phenomenon wherein the particulate material moving gravitationally down within the hopper may become arched over the outlet opening thereafter preventing or impairing further flow of the material.

Various solutions have therefore been proposed to obviate the problem of bridging. One approach has been to subject the hopper to intermittent compound displacements to break up bridging of the material within the hopper. For example, one particular prior device of this type includes an inverted frustoconical hopper having a vertical axis of symmetry. This prior hopper is subjected to cyclic rotary displacement about the vertical hopper axis and to concurrent vertical reciprocation of the whole hopper along the vertical axis to agitate the material, thus diminishing the possibility of material bridging.

Although such prior device may be generally satisfactory for breaking up bridging of the material, there may sometimes be undesirable side effects associated with its use. For example, the bridging action usually occurs in the lower portion of the hopper adjacent the outlet and it is there that the most vigorous breaking up action is required. However, with the arrangement just described, vertical and rotational displacement of the material within the hopper occurs uniformly throughout the vertical extent of the hopper with the result that the degree of agitation necessary to break up bridged material in the lower portion of the hopper is applied equally to material in the upper portion of the hopper. This degree of agitation may be sufficient to cause considerable fluffing and displacement of material in the upper part of the hopper with certain serious disadvantages.

For example, it is frequently a prime purpose of using a hopper to allow the particulate material to settle into a more compacted and denser condition (e.g. for subsequent packaging) and this purpose is entirely frustrated if the contents of the hopper are maintained in a state of continuous agitation persisting in equal intensity throughout the entire hopper.

Other disadvantages of such vigorous agitation of the material at the top of the hopper may include the possible loss of some material as dust entering the atmosphere around the top of the hopper and the attendant creation of a very dusty atmosphere around the hopper leading to unpleasant working conditions.

SUMMARY OF INVENTION

It is therefore a general object of the invention to provide a method and apparatus for feeding particulate material which obviates or minimizes problems of the type previously discussed.

It is a particular object of the invention to provide a method and apparatus for feeding particulate material utilizing an agitated gravitational hopper, wherein a maximum agitation is imparted to the material adjacent the location where bridging is most likely to occur with a reduced level of agitation being imparted to material adjacent the entry to the hopper.

It is a further object of the invention to provide a method and apparatus for feeding particulate material utilizing a hopper wherein a compound agitatory motion is imparted to the material, which is most violent adjacent a lower outlet from the hopper and least violent adjacent an upper entry to the hopper to effectuate the most effective break up of bridging without causing substantial disturbance of material at the top of the hopper.

It is another object of the invention to provide a method and apparatus for feeding particulate material wherein the material is subjected to a compound agitation comprising a side-to-side horizontal throwing action and a vertical rocking action to most effectively break up any bridging of the material.

A method of feeding particulate material according to a preferred embodiment of the invention, is intended to achieve at least some of the foregoing objects. The method utilizes a vertically extending hopper having an upper, inlet opening and a lower, outlet opening. Wall means extending between the openings is configured to cause material within the hopper to move gravitationally downward to the outlet. The method includes a step of subjecting the hopper to cycles of transverse oscillation in a generally horizontal predetermined path to impose side-to-side horizontal throwing action on the material within the hopper. The hopper is additionally subjected to cycles of oscillating rocking motion about a generally horizontal axis occurring at some point during each cycle of transverse oscillation.

This combined rocking and throwing action imposed to the material has been found to be very effective in breaking up and preventing the development of bridges in the material which might otherwise impede outfeed of the material from the hopper.

In another significant method aspect of the invention, the step of applying oscillating transverse motion to the hopper includes a step of applying oscillatory rotary motion to the hopper about a generally vertical axis passing radially centrally of the hopper adjacent the inlet but offset radially from the hopper outlet. This causes confined material within the hopper adjacent the outlet to experience substantially linear oscillatory side-to-side displacement. Material adjacent the upper part of the hopper, however, experiences mainly rotary displacement and due to the inertia of the powder much of the agitation is lost through shear between the powder and the hopper wall. Thus, this arrangement has the advantage of maximizing the agitatory forces applied to the material in the hopper in the area adjacent the lower end of the hopper where bridging is most likely to occur while at the same time minimizing the degree of disturbance imposed on the material at the upper end of the hopper.

An apparatus for feeding particulate material according to a preferred embodiment of the invention, includes a hopper for the material. The hopper includes an upper inlet opening, a lower outlet opening and wall means extending vertically between the inner and lower openings adapted to confine the material and to cause the material to move gravitationally down towards the outlet opening. Frame means supporting the hopper for limited motion. Oscillating means is connected with the frame means and with the hopper for applying an oscillating transverse motion to the hopper in a predetermined generally horizontal path. This exerts a side-to-side, horizontal throwing action on material within the hopper. Rocking means is also connected with the hopper and the frame means for causing at least one cycle of vertical rocking motion of the hopper about a horizontal axis at some point during each cycle of oscillatory motion. The rocking displacement imparted to the material within the hopper augments the side-to-side throwing displacement to provide a compound action which is most effective in breaking up bridging developing within the material.

In more detail, the frame means supports the hopper for rotational movement about a vertical axis passing radially centrally of the hopper adjacent the upper inlet but with the outlet opening offset radially from the vertical axis. The oscillating means is connected to the frame means and applies an oscillating rotary motion to the hopper about the vertical axis. This causes the material within the hopper adjacent the outlet to experience a greater degree of agitation than at the inlet with the result that agitatory action is concentrated near the outlet where bridging is most likely and reduced near the inlet where too much agitation would be undesirable.

THE DRAWINGS

An apparatus for feeding particulate material constructed in accordance with the preferred embodiment of the invention is illustrated in the accompanying drawings in which:

FIG. 1 is a side view of an apparatus for feeding particulate material, according to one preferred embodiment of the invention;

FIG. 2 is a front view of the apparatus shown in FIG. 1;

DETAILED DESCRIPTION

Referring to FIG. 1 of the drawings, an apparatus for feeding particulate material, constructed in accordance with a preferred embodiment of the invention, is there shown. The apparatus includes a vertically extending hopper 2 supported by an openwork frame generally designated 4.

Figure 3:
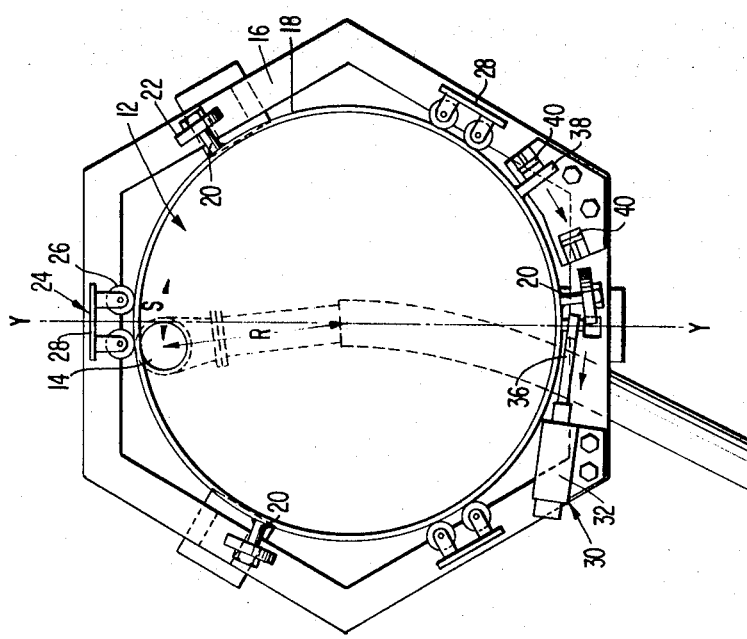
FIG. 3 is a top view of the apparatus shown in FIG. 2 taken along the lines 3-3 therein showing an oscillating motor forming a part of the present invention in an extended position.

The hopper 2 includes a hopper wall 6 configured as an inverted, truncated, slant cone. The hopper wall 6 is disposed with a forward peripheral surface portion 8 extending vertically. A rearward peripheral portion 10 of the hopper wall is inclined at an angle to the vertical which is steeper than the angle of repose of particulate material confined within the hopper wall 6. With this construction, the particulate material within the hopper wall 6 is induced to flow gravitationally downwardly within the hopper 2 from an upper, circular inlet opening 12 (FIG. 3) at the top of the hopper to a lower, circular outlet opening 14 at the base of the hopper.

The inlet opening 12 at the top of the hopper lies generally in a horizontal plane. The hopper 12 is supported by the frame 4 for rotation about a vertical axis X-X (FIG. 1) concentric with the circular inlet opening 12. However, by virtue of the slanted cone construction of the hopper wall 6 the lower outlet opening 14 is radially offset by a distance R from the vertical axis X-X (FIG. 3) so that rotation of the hopper causes the outlet opening to move in an arcuate path S centered on and spaced from the vertical axis X-X. The frame 4 also supports the hopper 2 for limited upward motion from the frame.

To mount the hopper 2 with the frame 4 for both rotary and vertical motion in this manner, the frame 4 at its upper end is provided with a hexagonal horizontal track 16 (FIG. 3) having a flat, horizontal upper surface. The track 16 is positioned generally on a level with the upper part of the hopper wall 6 and extends in spaced relation thereareound. The hopper wall 6 at its upper end is provided with an upwardly extending rim 18 (FIGS. 1 and 2) of uniform internal and external diameters projecting upwardly above the upper surface of the track 16.

Secured to the rim 18 projecting radially, horizontally outwardly therefrom are three stub shafts 20 (FIG. 3) spaced equally above the periphery of the rim 18 at 120° intervals. Each stub shaft 20 is provided adjacent its free, radially outward end with a wheel 22 mounted for rotation about the axis of the stub shaft. The wheels 22 of the three stub shafts each rest upon an underlying adjacent portion of the track 16 to support the hopper 2 vertically on the frame 4 while at the same time permitting limited arcuate rotation of the hopper 2 about the vertical axis X-X. Obviously, the extent of rotation is less than that at which further rotation would cause the wheels 22 to move internally off the track 16.

To guide the hopper 2 during rotation so that the rim 18 does not move out of concentricity with the vertical axis X-X, three pairs 24 of guide wheels 26 are spaced equally about the track 16 at 120° intervals. The guide wheels 26 in each pair 24 are supported for rotation about vertical axes by brackets 28 connected with the track, with the guide wheels in each pair abuttingly and rollingly contacting the adjacent vertical, outward peripheral surface of the rim 18.

An oscillating rotary motion about the axis X-X is imparted to the hopper 2 relative to the frame 4, by a reciprocating motor 30. The reciprocating motor in the preferred embodiment comprises a hydraulic jack having a jack cylinder 32 connected to the track 16 and a jack piston 34 which is selectively extended and retracted into the jack cylinder 32. The jack 30 is mounted with the jack piston 34 generally tangential to and spaced radially adjacent the outer periphery of the rim 18. At its free forward end the jack piston rod 34 is pivotally connected to a radially projecting, horizontal stub shaft 36 extending horizontally and radially outwardly from a fixed point of connection to the exterior of the rim 18. The jack cylinder 30 is mounted for limited vertical pivoting motion about a horizontal axis at its point of fixed connection to the track 16 to allow the jack 30 to compensate for limited vertical motion of the hopper 2 relative to the frame 4, as will be described.

Figure 4:
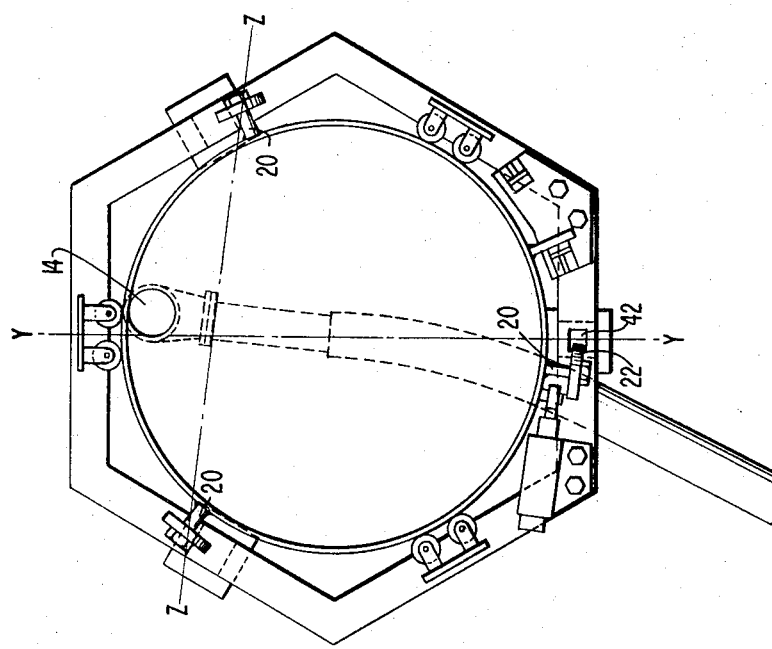
FIG. 4 is a top view of the apparatus similar to FIG. 3 but with the oscillating motor shown in a retracted condition.

The positioning of the pin 36 on the hopper 2 in relation to the position of the lower outlet opening 14 is such that when the jack piston 34 is in the fully extended position (shown in FIG. 3) the outlet opening 14 is displaced a predetermined amount to the left of a vertically extending transverse diametral plane Y-Y of the unit. When the jack piston 34 is fully retracted into the jack cylinder 32 (FIG. 4) this causes the hopper 2 to be rotated about the vertical axis X-X to a second position in which the outlet opening 14 is now positioned a corresponding distance on the other side of the transverse diametrical plane Y-Y.

In moving from one extreme position to the other extreme position, the inlet opening 14 is caused to undergo transverse motion along the predetermined arcuate paths. Because the length of the arcuate path is governed by the limited length of the working stroke of the hydraulic motor 30 and because the arc is of relatively great radius, the motion undergone by the inlet opening 14 is substantially linear transverse motion.

At each extreme end of the oscillating motion, the hopper is abruptly stopped by impingement of a radial stop bar 38 projecting from the rim 18 upon one or other of two radially spaced stops 40 fixedly secured to the track 16. This causes a rapid deceleration of the transverse motion of the inlet opening 14 with the result that the material inside the lower part of the hopper 2 adjacent the outlet opening is subjected to an abrupt sideways throwing action. This side-to-side throwing action is experienced on each rapid deceleration of the transverse motion of the inlet opening upon each impact of the stop member 30 with one of the stops 40. Additionally, the side-to-side throwing action is experienced to a somewhat lesser degree during each acceleration of the inlet motion from one extreme position toward the other extreme position.

It will be appreciated that the side-to-side throwing action is relatively most intense at the lower end of the hopper where the material confined by the relatively small diameter wall moves substantially linearly without developing rotary shearing motion between the wall and the particulate material likely to reduce the effectiveness of the agitation. As for the material in the relatively larger diameter upper part of the hopper, this is subjected to substantially rotary motion only with the result that the relatively larger inertia of the greater mass of material in the upper part of the hopper causes it to lag somewhat behind the rotary motion of the hopper wall thus leading to loss of agitation due to shear. Thus, the relatively high level of agitation necessary to break up bridged material is concentrated adjacent the outlet opening where such bridging is likely to occur while in the upper half of the hopper the level of agitation is considerably less intense so that fluffing of the material is reduced.

Conventional time delay hydraulic circuitry (not shown) is included in the hydraulic supply circuit to the motor 30 to provide dwell periods between and during cycles of hopper motion. More detailed discussion of the dwell and shear effects is contained in applicant's U.S. Pat. No. 3,278,081,the relevant portion of which is deemed to be included herein by reference.

The side-to-side throwing action for breaking up the bridging of material is augmented by a vertical rocking action. This is achieved by positioning an upwardly extending cam 42 (FIG. 2) in the path traveled by one of the wheels 22 connected to the hopper 2. As the wheel during its arcuate travel encounters the cam 42 the wheel 22 is raised. This causes the side of the hopper to which the particular wheel 22 is connected to be elevated while the remaining wheels 22 of the hopper continue to remain on the track 16 at their original level. The net effect is an upward rocking action of the hopper about an instantaneous fulcrum Z-Z (FIG. 4) defined by the points of contact of the remaining two wheels 22 with the track 16. As the cam passes down the other side of the cam 42 a downward rocking action is experienced about the same fulcrum.

The combined action of the vertical rocking and side-to-side throwing forces imposed upon the material in the hopper has been found very effective in breaking up bridged material within the hopper and in preventing development of bridging so as to maintain smooth flowing of material through and out of the hopper.

To conduct material away from the hopper, a flexible pipe line 46 is connected through an elbow bend fitting 48 to the outlet opening 14. The flexible conduit 46 in its approach to the outlet opening 14 is caused to extend for a certain distance along the transverse axis Y-Y so that side-to-side deflection of the flexible outlet conduit 46 occurs symmetrically.

SUMMARY OF ADVANTAGES

It will be appreciated that in following the method and apparatus of the present invention for the feeding of particulate material, significant advantages are provided.

In particular, the combined side-to-side transverse throwing action and vertical rocking action imparted to the material in the hopper has been found to be extremely effective in breaking up bridging of the material.

Also very significant is the manner in which the violent agitation necessary to break up bridging is directed to the portion of the hopper adjacent the outlet where bridging is most likely to occur while the remainder in the upper half of the hopper experiences a less intense level of agitation so as to avoid undesirable fluffing of the upper material.

In this connection, the position of the outlet opening of the hopper at a radially offset location relative to the axis of rotary oscillation of the hopper inlet opening, is particularly significant.

Although the invention has been described with reference to a preferred embodiment, it will be appreciated than many additions, deletions, substitutions, modifications and other changes not specifically disclosed or described may be made which will fall within the purview of the appended claims.

I claim:

1. A method of feeding particulate material utilizing a vertically extending hopper having an upper, inlet opening and a lower, outlet opening and wall means extending between the openings configured to cause material within the hopper to move gravitationally downward to the outlet opening, the method comprising the steps of:

subjecting the hopper to cycles of oscillating transverse motion in a generally horizontal predetermined path to impose a side-to-side, horizontal throwing action on the material within the hopper, said oscillating transverse motion being produced by:

applying oscillatory rotary motion to the hopper about a vertical axis passing radially centrally of the hopper adjacent the hopper inlet and offset radially from the lower outlet opening to cause the material within the hopper to experience a greater degree of side-to-side horizontal throwing agitation adjacent the hopper outlet than that experienced adjacent the inlet; and subjecting the hopper to at least one cycle of oscillating rocking motion about a generally horizontal axis during each cycle of transverse motion of the hopper to impose a rocking action on the material.

2. A method of feeding particulate material utilizing a vertically extending hopper having an upper, inlet opening and a lower, outlet opening and wall means extending between the openings configured to cause material within the hopper to move gravitationally downwardly to the outlet opening, the method comprising the steps of:

subjecting the hopper to cycles of oscillating transverse motion in a generally horizontal predetermined path to impose a side-to-side, horizontal throwing action on the material within the hopper, said oscillating transverse motion being produced by:

applying oscillatory rotary motion to the hopper about a vertical axis passing radially centrally of the hopper adjacent the hopper inlet and offset radially from the lower outlet opening to cause the material within the hopper to experience a greater degree of agitation adjacent the hopper outlet than that experienced adjacent the inlet; and subjecting the hopper to at least one cycle of oscillating rocking motion about a generally horizontal axis during each cycle of transverse motion of the hopper to impose a rocking action on the material by:

applying a cycle of vertical motion to a point on the hopper radially offset from the vertical axis during the cycle of transverse motion.

3. A method as defined in claim 2 including a further step of:

causing the hopper to experience stationary periods of rest intermediate cycles of oscillating transverse motion.

4. An apparatus for feeding particulate material comprising:

a vertically extending hopper for the material, said hopper including:

an upper, inlet opening having a generally vertical axis;

an outlet opening spaced below said inlet opening and having a generally vertical axis radially offset from the axis of said inlet opening;

wall means extending between said upper and lower openings adapted to confine the material and to cause the material to move gravitationally toward said outlet opening; and frame means connected to said hopper and supporting said hopper for limited rotational motion generally about the vertical axis of said inlet opening, said frame means further supporting said hopper for limited vertical motion;

oscillating means connected with said frame means and with said hopper for applying an oscillating transverse motion in a generally horizontal, predetermined path to the hopper to impose a side-to-side, horizontal throwing action on the material within the hopper, said oscillating means includes:

means connected with said frame means for applying oscillatory rotary motion to said hopper about the vertical axis of said inlet opening to oscillate said outlet opening transversely along a predetermined arcuate path to cause material within the outlet opening of the hopper to be subjected to a greater intermittent side-to-side throwing action than material within the inlet opening of the hopper; and rocking means connected with said container and with said frame means for causing intermittent vertical rocking motion of said hopper about a horizontal axis at periods occurring during cycles of operation of said oscillating means.

5. An apparatus for feeding particulate material comprising:

a vertically extending hopper for the material, said hopper including:

an upper, inlet opening;

an outlet opening spaced below said inlet opening; and wall means extending between said upper and lower openings adapted to confine the material and to cause the material to move gravitationally toward said outlet opening;

frame means connected to said hopper supporting said hopper for limited motion;

oscillating means connected with said frame means and with said hopper for applying an oscillating transverse motion in a generally horizontal, predetermined path to the hopper to impose a side-to-side, horizontal throwing action the material within the hopper;

rocking means connected with said container and with said frame means for causing intermittent vertical rocking motion of said hopper about a horizontal axis at periods occurring during cycles of operation of said oscillating means; and delay means connected with said oscillating means for causing intermittent periods of dwell between successive cyclic operations of said oscillating means.

6. An apparatus for feeding particulate material comprising:

a vertically extending hopper for the material, said hopper including:

an upper, inlet opening having a generally horizontally disposed circular rim and a generally vertically disposed axis;

an outlet opening spaced below said inlet opening, wherein said outlet opening is of smaller diameter than said inlet opening and having a generally vertically extending axis radially offset from the axis of said inlet opening; and wall means extending between said upper inlet opening and said lower outlet opening having a generally frustoconical shape and adapted to confine the material and to cause the material to move generally toward said outlet opening;

frame means connected to said hopper and supporting said hopper for limited rotational motion about the generally vertical axis of said inlet opening;

reciprocating means connected with said frame means and with said hopper for applying reversible transverse motion in a generally horizontal, predetermined path to the hopper to impose a side-to-side horizontal throwing action on the material within the hopper, said reciprocating means including; and means connected with said frame means for applying reciprocating rotary motion to said hopper about said inlet opening vertical axis to reversibly traverse said outlet opening along a predetermined arcuate path to cause material within the hopper to be subjected to said intermittent side-to-side throwing action.

7. An apparatus as defined in claim 6, wherein:

said outlet opening is spaced sufficiently radially outwardly from said vertical axis to position a radially outermost portion of said outlet opening vertically beneath a corresponding vertically adjacent portion of said rim.

8. An apparatus as defined in claim 6, further including:

support members connected with said rim; and wherein said frame means further includes:

a generally horizontal track extending about said hopper, said support members resting upon said track for motion thereon to support said hopper for rotational motion about said vertical axis; and guiding means connected with said track, said guiding means peripherally contacting said rim for preventing radial motion of said rim relative to said track out of concentricity with said vertical axis.

9. An apparatus as defined in claim 8, and further comprising:

rocking means connected with said hopper and with said frame means for causing intermittent vertical rocking motion of said hopper about a horizontal axis at periods occurring during cycles of operation of said reciprocating means including;

a vertically projecting cam fixedly secured to said track at a predetermined point thereon; and cam contacting means connected with said rim at a predetermined peripheral point thereon, said cam contacting means at an intermediate point during each cycle of traverse reciprocation contacting said cam at least once to move said point on said rim upwardly from said track and back again during motion of said cam contacting means past said cam thereby imparting a vertical rocking motion to said hopper.

10. An apparatus as defined in claim 8, wherein:

said reciprocating means includes;

a reversible reciprocating motor having:

a motor housing connected with said track; and a piston cyclically reciprocable relative to said motor housing, said piston being connected at a free end thereof to a point on said rim in generally tangential horizontally disposed relation thereto.